(12) United States Patent
Hui et al.

(10) Patent No.: US 11,326,722 B2
(45) Date of Patent: May 10, 2022

(54) LINE ORGANIZER

(71) Applicant: Teck Keung Industrial Limited, Hong Kong (CN)

(72) Inventors: Conway Kin Wai Hui, Hong Kong (CN); Chi Hung Kung, Hong Kong (CN)

(73) Assignee: Teck Keung Industrial Limited, Hong Kong (CN)

( * ) Notice: Subject to any disclaimer, the term of this patent is extended or adjusted under 35 U.S.C. 154(b) by 0 days.

(21) Appl. No.: 16/759,260

(22) PCT Filed: Oct. 25, 2017

(86) PCT No.: PCT/CN2017/107720
§ 371 (c)(1),
(2) Date: Apr. 24, 2020

(87) PCT Pub. No.: WO2019/080021
PCT Pub. Date: May 2, 2019

(65) Prior Publication Data
US 2020/0370680 A1 Nov. 26, 2020

(51) Int. Cl.
*F16L 3/227* (2006.01)
*F16B 2/22* (2006.01)
(Continued)

(52) U.S. Cl.
CPC ............... *F16L 3/227* (2013.01); *F16B 2/22* (2013.01); *F16L 3/1211* (2013.01); *F16L 3/137* (2013.01); *F16L 3/222* (2013.01)

(58) Field of Classification Search
CPC ......... F16L 3/227; F16L 3/1211; F16L 3/137; F16L 3/222; F16B 2/22
See application file for complete search history.

(56) References Cited

U.S. PATENT DOCUMENTS 4,114,241 A * 9/1978 Bisping .................. F16L 3/222
403/188
4,526,333 A 7/1985 Nakama et al.
(Continued)

FOREIGN PATENT DOCUMENTS

CN 101180488 A 5/2008
CN 204677903 U 9/2015
(Continued)

OTHER PUBLICATIONS

World Intellectual Property Organization, International Search Report for International Application No. PCT/CN2017/107720, dated Jul. 20, 2018, total of 4 pages.
(Continued)

*Primary Examiner* — Anita M King
(74) *Attorney, Agent, or Firm* — SoCal IP Law Group LLP; Mark Andrew Goldstein

(57) ABSTRACT

A line organizer (1) comprising: a base (2); a retainer (3) attachable to the base (2) for retaining a line between the base (2) and the retainer (3); a first connector (4) on the base (2); and a second connector (5) on the base (2). The line organizer (1) is a first line organizer (1), and the first connector (4) on the first line organizer (1) is attachable to the second connector (5) on a second said line organizer (1a) to connect the first and second line organizers (1,1a) to each other.

19 Claims, 7 Drawing Sheets

(51) Int. Cl.
*F16L 3/12* (2006.01)
*F16L 3/137* (2006.01)
*F16L 3/22* (2006.01)

(56) References Cited

U.S. PATENT DOCUMENTS

| | | | | |
|---|---|---|---|---|
| 4,618,114 | A * | 10/1986 | McFarland | F16L 3/13 248/220.21 |
| 4,728,064 | A * | 3/1988 | Caveney | B65D 63/1081 248/74.3 |
| 5,154,376 | A * | 10/1992 | Baum | F16L 3/2332 24/16 PB |
| 5,730,399 | A * | 3/1998 | Baginski | H02G 3/263 24/16 PB |
| 6,607,169 | B1 | 8/2003 | Gershfeld | |
| 6,994,300 | B2 | 2/2006 | Labeirie et al. | |
| 9,021,681 | B2 * | 5/2015 | Owen | B65D 63/1081 29/525.01 |
| 10,151,406 | B2 * | 12/2018 | Netke | F16L 3/13 |
| 10,569,946 | B2 * | 2/2020 | Vaverka | B65D 63/1063 |
| 2005/0077436 | A1 | 4/2005 | Nelson | |

FOREIGN PATENT DOCUMENTS

| | | |
|---|---|---|
| CN | 105122555 A | 12/2015 |
| CN | 106895210 A | 6/2017 |
| EM | 0816735 A1 | 1/1998 |
| FR | 2930303 A1 | 10/2009 |
| FR | 2991113 A1 | 11/2013 |
| WO | 2019080021 A1 | 5/2019 |

OTHER PUBLICATIONS

Chinese Intellectual Property Office, Office Action for Chinese application No. 201780097716.X, dated Jul. 16, 2021, 10 total pages.

European Intellectual Property Office, Search Report and Written Opinion for European application No. 17929613.2, dated May 18, 2021, 8 total pages.

* cited by examiner

[Fig. 1]
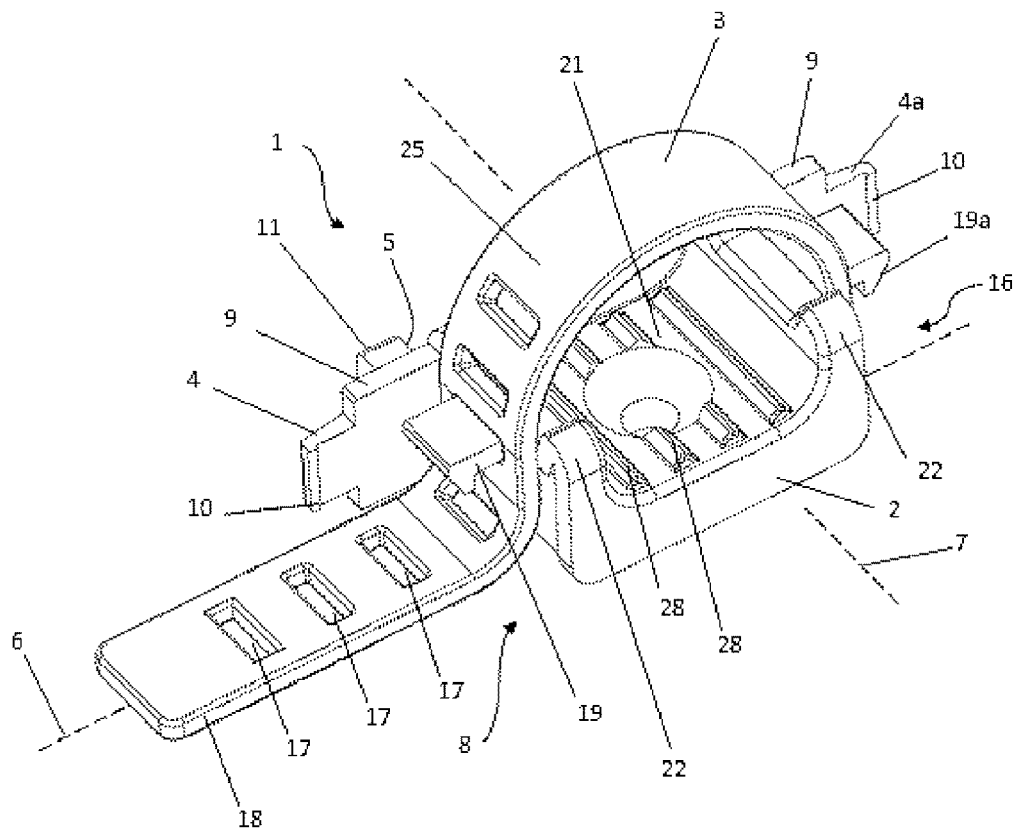
[Fig. 2]
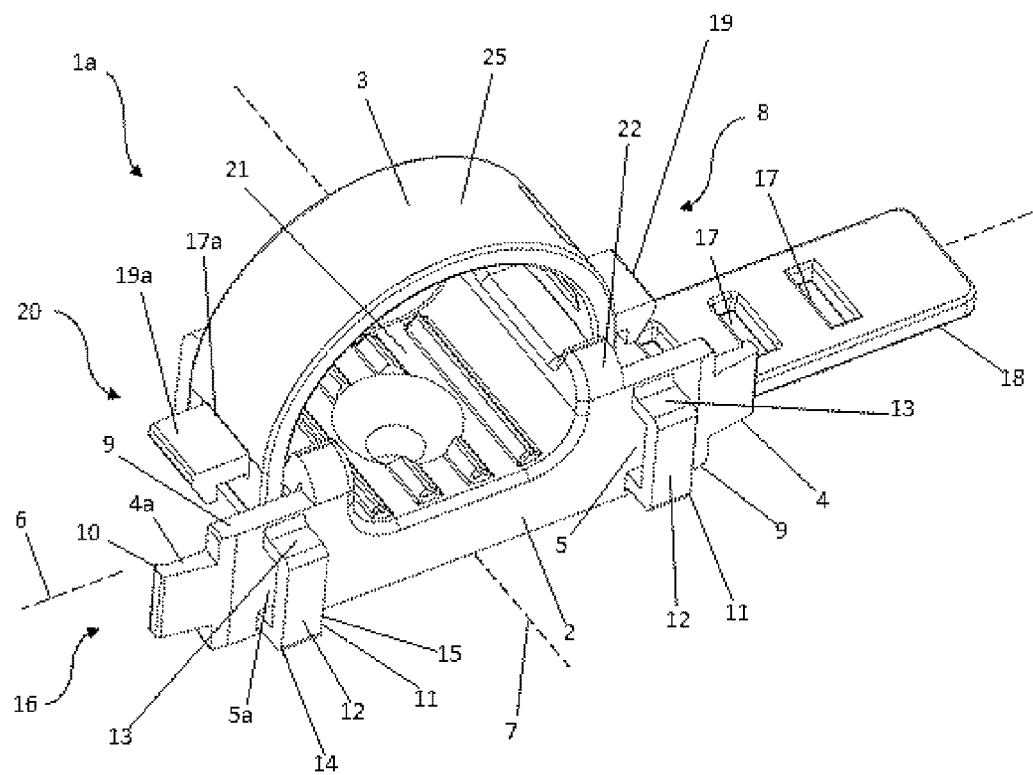

[Fig. 3]
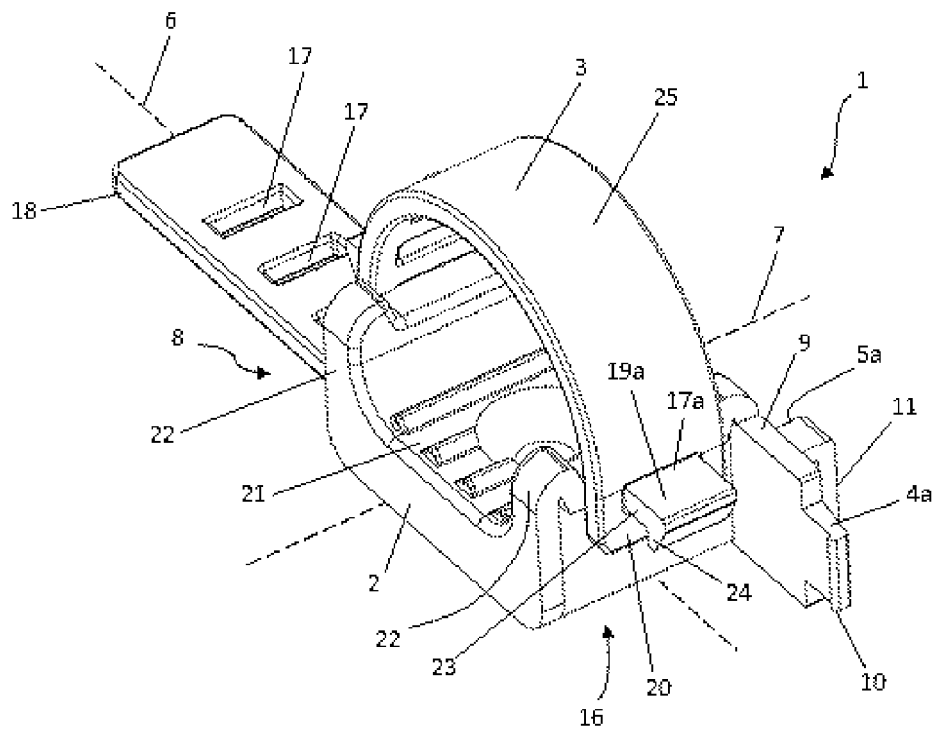
[Fig. 4]
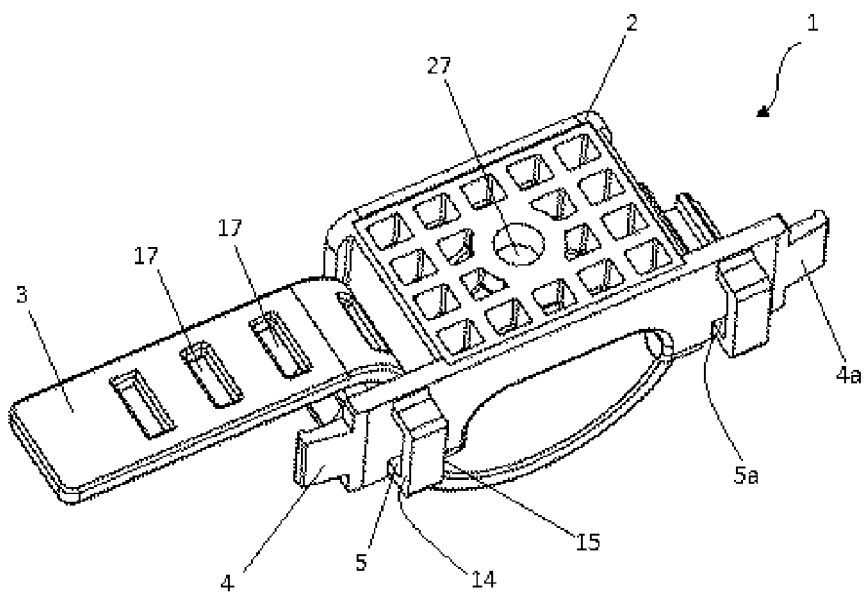

[Fig. 5]
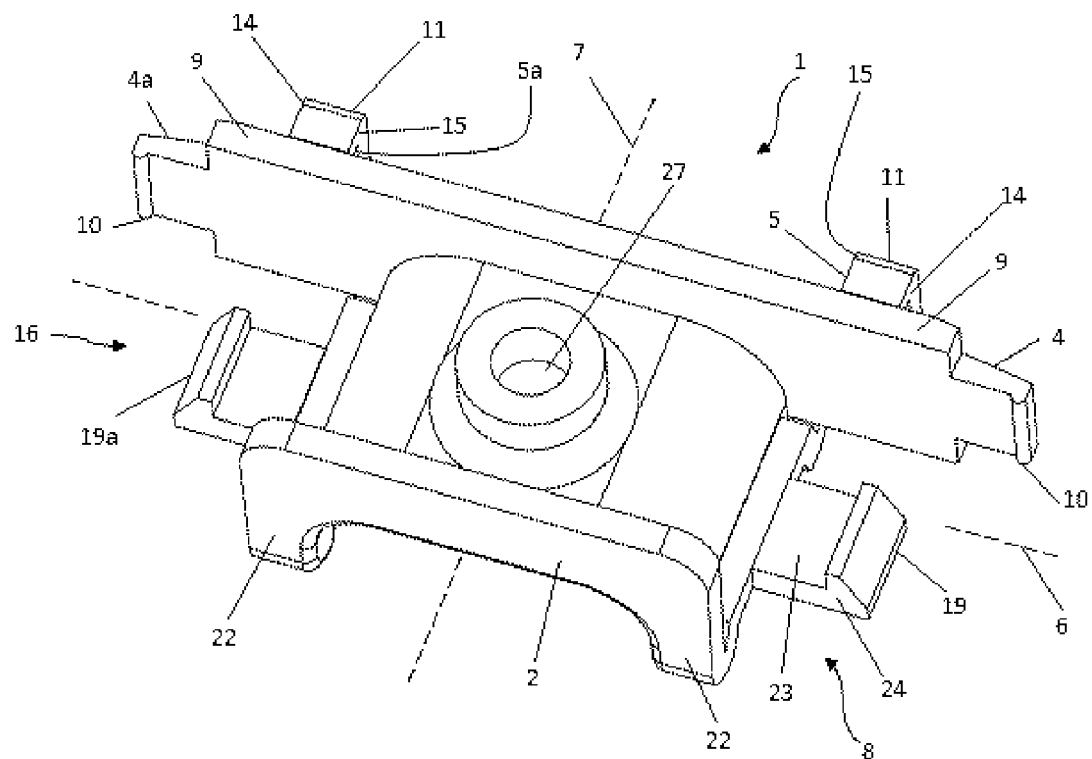
[Fig. 6]
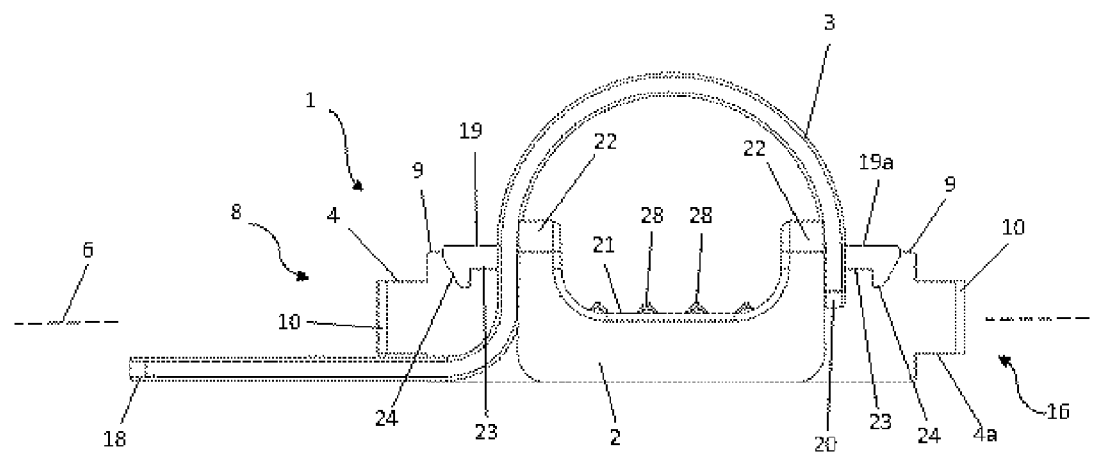

[Fig. 7]
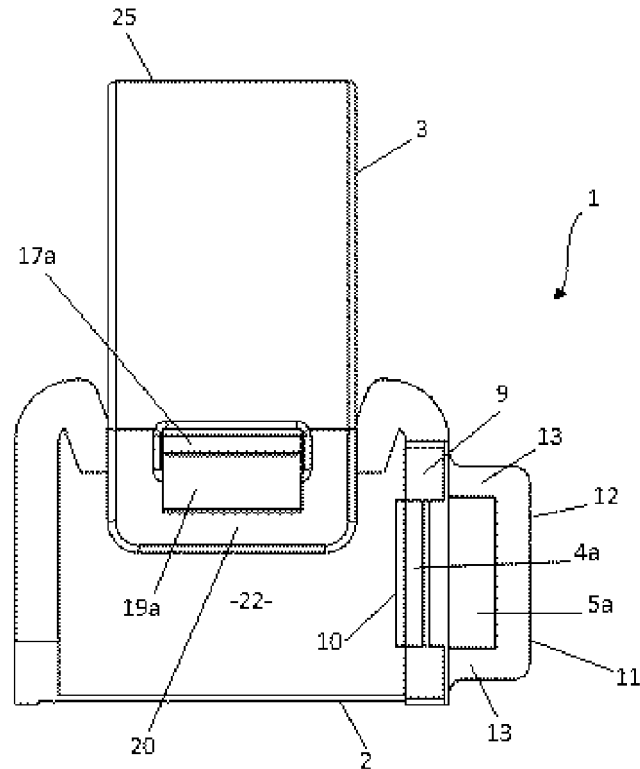
[Fig. 8]
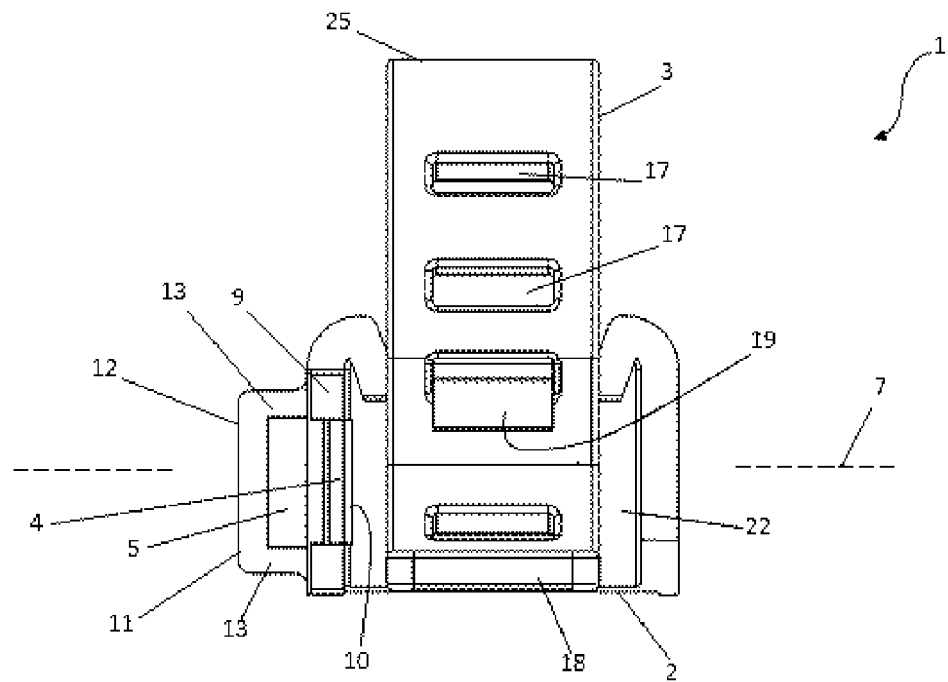

[Fig. 9]
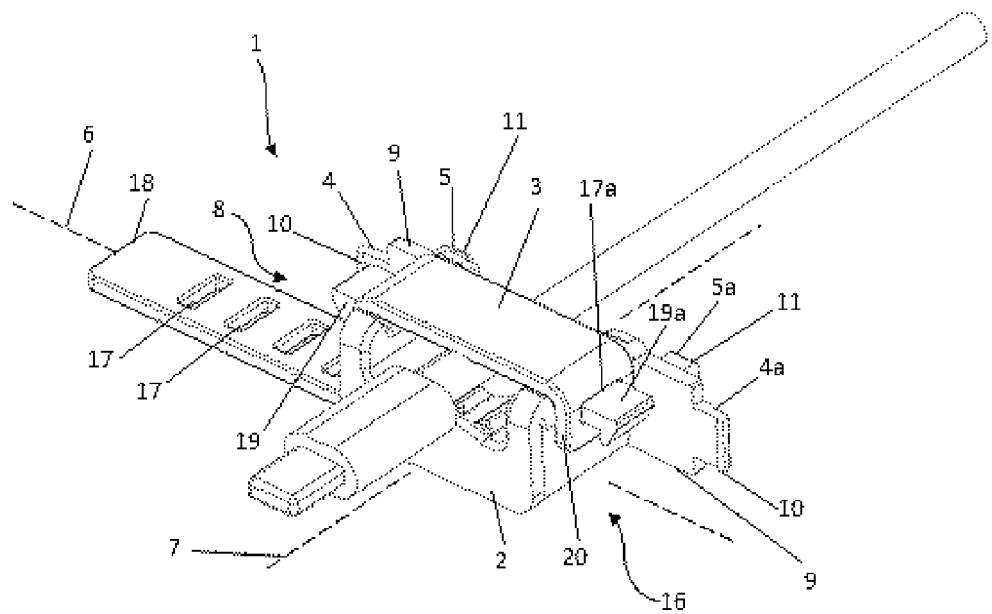
[Fig. 10]
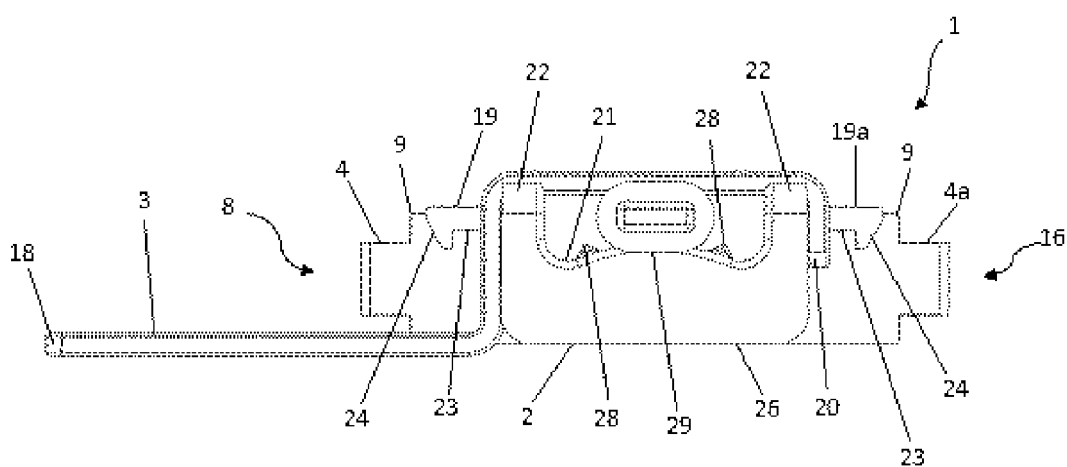

[Fig. 11]
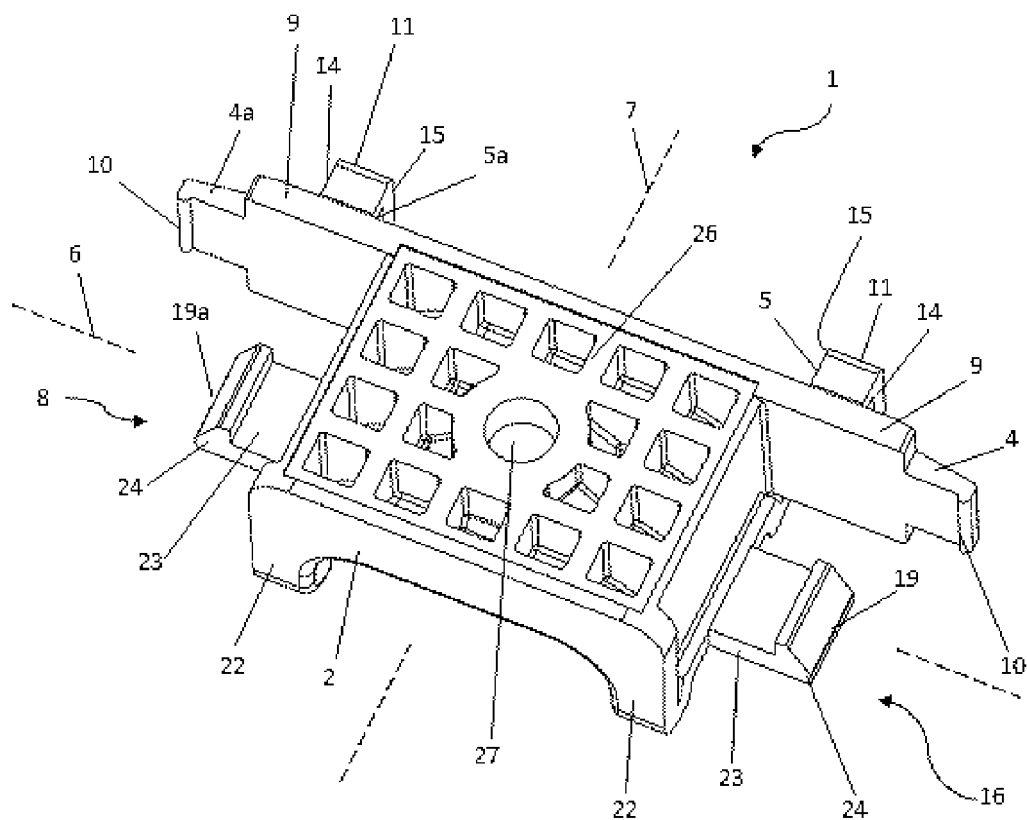
[Fig. 12]
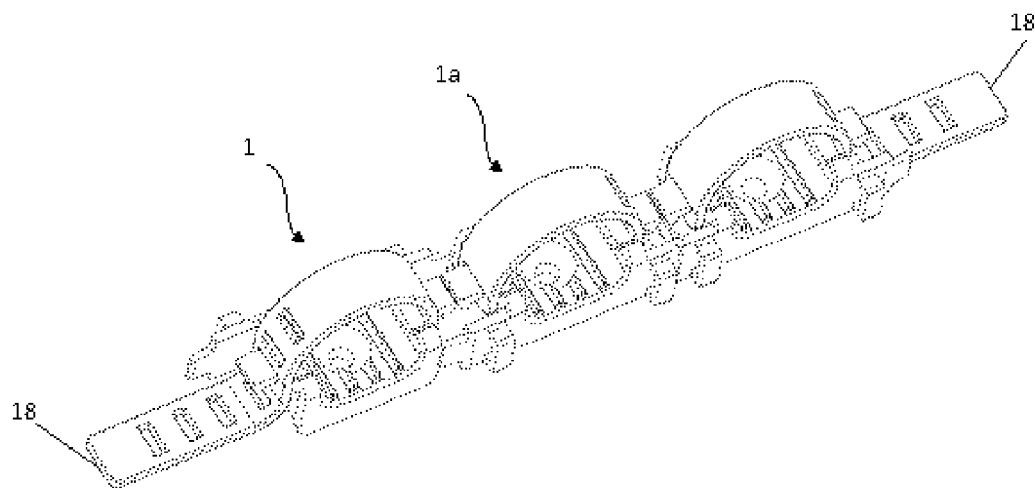

[Fig. 13]
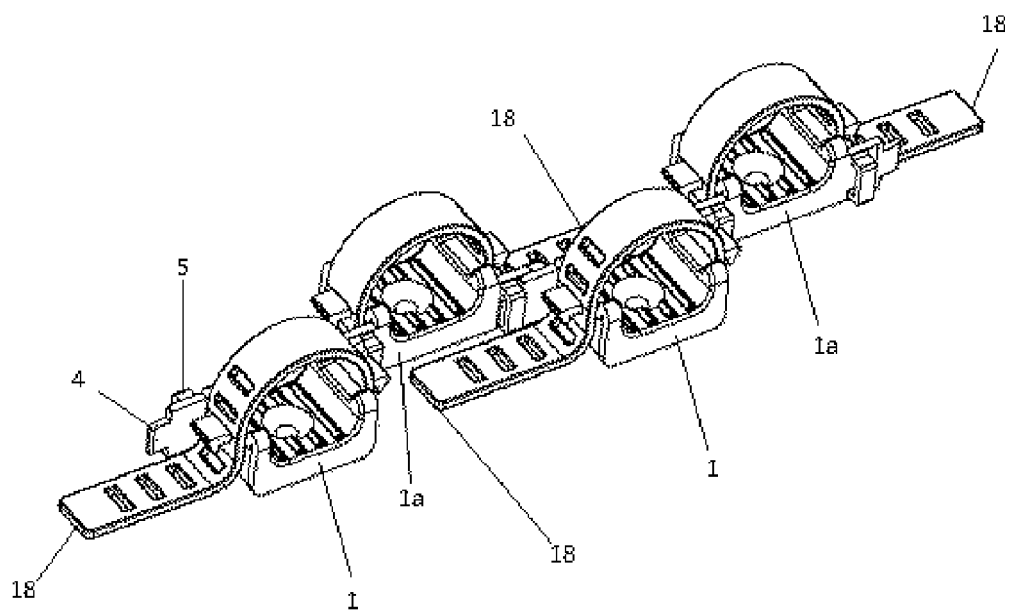

LINE ORGANIZER

RELATED APPLICATION INFORMATION

This patent claims priority from International PCT Patent Application No. PCT/CN2017/107720, filed Oct. 25, 2017 entitled "LINE ORGANIZER", which is incorporated herein by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The invention relates to line organizers, particularly those used in managing the arrangement of lines such as cables, cords, and wires.

BACKGROUND ART

Many prior devices and apparatus exist to manage lines such as cables, cords, and wires that carry power and telecommunications signals. These take the form of clips, ties, loops, channel systems, and the like. For example, a typical clip comprises a base that attaches to a substrate and a loop formed on the base in two segments that can be moved apart and together to open and close the loop respectively. The loop is opened, a line is located inside the loop, and then the loop is closed to retain a portion of the line at the clip location. A plurality of loops in series can be deployed to string out a line along a predetermined path.

Multiple lines can be retained with multiple series of clips. However, as the number of clips increase, it becomes difficult to maintain a neat and tidy appearance. Also, in this situation, it is advantageous to be able to label the lines. Prior methods include tying labels to the clips and/or lines. However, this can be tedious and time-consuming where a multitude of lines are involved.

Ties include simple lengths of material that are used to tie a line or a bundle of lines together. The ties can then be attached to a substrate to fix the location of the tie and the tied line or lines. As well as having the disadvantages of clips as discussed above, ties are often difficult to untie and reuse. Zip ties are similar and have similar disadvantages, as well as the further disadvantage that they cannot be reused since they are not designed to be untied.

It is an object of the present invention to overcome or ameliorate at least one of the disadvantages of the prior art, or to provide a useful alternative.

SUMMARY OF INVENTION

The present invention provides a line organizer comprising:
 a base;
 a retainer attachable to the base for retaining a line between the base and the retainer;
 a first connector on the base; and
 a second connector on the base;

said line organizer being a first line organizer, the first connector on the first line organizer attachable to the second connector on a second said line organizer to connect the first and second line organizers to each other.

In one embodiment, the retainer wraps over the base along a transverse axis, and the first connector on the first line organizer is attachable to the second connector on the second line organizer such that the transverse axis of the first line organizer is parallel to and longitudinally offset from the transverse axis of the second line organizer such that the retainer attached to the first line organizer is not obstructed by the second line organizer when the retainer attached the first line organizer is wrapped over the base of the first line organizer.

In one embodiment, the first connector is a tab extending from a side of the base and the second connector is a slot, the tab of the first line organizer receivable into the slot of the second line organizer to connect the first and second line organizers to each other. In one embodiment, the tab is snap-lockingly engagable in the slot.

In one embodiment, the line organizer comprises a further first connector extending from an opposite side of the base and a further second connector such that the second line organizer is connectable to either side of the base.

In one embodiment, the first connector on the first line organizer is attachable to the second connector on the second line organizer and the first connector on the second line organizer is simultaneously attachable to the second connector on the first line organizer to connect the first and second line organizers to each other.

In one embodiment, the retainer is a strap. In one embodiment, the strap is resilient.

In one embodiment, the strap has an aperture towards a first end of the strap and the base has a protrusion, the protrusion receivable in the aperture to attach the strap to the base. In one embodiment, the strap has a plurality of said apertures along the strap to allow adjustment of the length or tension of a portion of the strap that wraps over the base thereby adjusting a clamping force exerted by the strap and the base onto the line positioned between the base and the strap.

In one embodiment, the strap has one or more apertures towards a second end of the strap and the base has a further protrusion, the further protrusion receivable in the aperture to attach the strap to the base.

In one embodiment, the protrusion and the further protrusion are positioned on opposing sides of the base to allow the strap to wrap over the base.

In one embodiment, the base has a platform and two opposing sidewalls extending away from the platform, the protrusion and the further protrusion each located on a respective said sidewall.

In one embodiment, the protrusion is a hook-like formation having a shaft and a head, the head being larger than the aperture and the shaft conforming with the aperture, the head or the aperture deforming from a resting shape when forced together to allow the head to pass through the aperture and then resiliently reverting to the resting shape after the head passes through the aperture thereby locking the strap onto the protrusion.

In one embodiment, the head or the aperture is deformable from a resting shape when forced apart to allow the head to pass through the aperture thereby releasing the strap from the protrusion.

In one embodiment, the retainer is releasably attachable to the base to allow the retainer to be removed from the base as a whole.

In one embodiment, the retainer has a labeling surface to allow a user to label the retainer.

In one embodiment, the base has an attachment surface on an underside to allow the base to be adhered to a substrate.

In one embodiment, the base has a fastening aperture for receiving a fastener to allow the base to be fastened to a substrate.

In one embodiment, the base has longitudinally extending ridges to minimize transverse movement of the line relative to the base.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

DESCRIPTION OF THE DRAWINGS

Preferred embodiments in accordance with the best mode of the present invention will now be described, by way of example only, with reference to the accompanying figures, in which the same reference numerals refer to like parts throughout the figures unless otherwise specified, and in which:

FIG. 1 is an isometric view of a line organizer according to an embodiment of the present invention;

FIG. 2 is another isometric view of the line organizer of FIG. 1;

FIG. 3 is another isometric view of the line organizer of FIG. 1;

FIG. 4 is a further isometric view of the line organizer of FIG. 1;

FIG. 5 is another isometric view of the line organizer of FIG. 1 shown without the strap;

FIG. 6 is a front view of the line organizer of FIG. 1;

FIG. 7 is a side view of the line organizer of FIG. 1;

FIG. 8 is another side view of the line organizer of FIG. 1;

FIG. 9 is an isometric view of a line organizer according to another embodiment of the present invention;

FIG. 10 is a front view of the line organizer of FIG. 9;

FIG. 11 is another isometric view of the line organizer of FIG. 9 shown without the strap;

FIG. 12 is an isometric view of a plurality of line organizers, each according to an embodiment of the present invention, and arranged in one configuration; and FIG. 13 is an isometric view of a plurality of line organizers, each according to an embodiment of the present invention, and arranged in another configuration.

DESCRIPTION OF EMBODIMENTS

Referring to the figures, there is provided a line organizer 1 comprising a base 2, and a retainer 3 attachable to the base for retaining a line between the base and the retainer. There is a first connector 4 on the base 2, and a second connector 5 on the base 2. In order to illustrate how multiple line organizers can be connected together, the line organizer 1 will be referred to as a first line organizer 1, and another said line organizer 1 will be referred to as a second line organizer 1a. The first connector 4 on the first line organizer 1 is attachable to the second connector 5 on the second line organizer 1a to connect the first and second line organizers to each other.

It is appreciated that the term "line" is a general term that includes cables, cords, wires, and the like. Such lines include those used to convey power and telecommunication signals, including power cables and data networking cables.

The retainer 3 wraps over the base 2 along a transverse axis 6. The first connector 4 on the first line organizer 1 is attachable to the second connector 5 on the second line organizer 1a such that the transverse axis 6 of the first line organizer 1 is parallel to and longitudinally offset from the transverse axis 6 of the second line organizer 1a such that the retainer 3 attached to the first line organizer 1 is not obstructed by the second line organizer 1a when the retainer 3 attached the first line organizer 1 is wrapped over the base of the first line organizer 1. It is appreciated that longitudinally offset means that the transverse axis 6 of the first line organizer 1 is offset from the transverse axis 6 of the second line organizer 1a in a direction that is perpendicular to the transverse axes 6, that is, a longitudinal direction along for example longitudinal axis 7.

This allows a plurality of line organizers (1, 1a) to be connected together whilst still allowing unobstructed access and operation of the retainers 3. For example, a plurality of line organizers (1, 1a) can be connected together in a zig-zag configuration with every second line organizer in a series of line organizers lined up on the same line, as best shown in FIG. 13. This advantageously avoids the drawbacks of connecting all of the plurality of line organizers (1, 1a) along a single line, as best shown in FIG. 12. In particular, the arrangement in FIG. 12 makes it difficult to wrap the retainer 3 over the base 2 of the line organizers (1, 1a).

In the embodiments shown, the first connector 4 is a tab extending from a side 8 of the base 2 and the second connector 5 is a slot. The tab 4 of the first line organizer 1 is receivable into the slot 5 of the second line organizer 1a to connect the first and second line organizers to each other. The tab 4 is snap-lockingly engagable in the slot 5.

The tab 4 extends along a tab plane from a wing 9 which in turn extends along a wing plane from the side 8 of the base 2. On the outer end of the tab 4 there is an engagement ridge 10 protruding substantially perpendicularly from the tab plane. The engagement ridge 10 protrudes inwardly towards the transverse axis 6. The slot 5 is formed by a rectangular arch-shaped formation 11 protruding from the wing 9 outwardly from the wing plane. The formation 11 comprises a top 12 that bridges across two legs 13 that protrude from the wing 9. To connect the first and second line organizers 1 and 1a to each other, the tab 4 of the first line organizer 1 is pushed into the slot 5 of the second line organizer 1a. The tab 4 and the formation 11 are dimensioned such that when the tab 4 of the first line organizer 1 is pushed into the slot 5 of the second line organizer 1a, the ridge 10 engages an outside edge 14 of the top 12 of the formation 11, bending the tab 4, which is resilient, away from the top 12, and away from a resting configuration for the tab 4, thereby allowing the ridge 10 to slide along the underside of the top 12 and thus allowing the tab 4 to slide into the slot 5. Once the ridge 10 reaches beyond an inside edge 15 of the top 12, the resilient tab 4 snaps back to the resting configuration where the ridge 10 abuts against the inside edge 15 thereby locking the tab 4 in the slot 5. A surface of the tab 4 on a side of the tab 4 opposite the ridge 10 can be tapered to provide clearance from the wing 9 to accommodate the bending of the tab 4.

To disconnect the first and second line organizers 1 and 1a from each other, a pulling force is applied to the first and second line organizers to pull the tab 4 of the first line organizer 1 out of the slot 5 of the second line organizer 1a. The tab 4 and the formation 11 are dimensioned and/or are of a resilience such that the pulling force required is larger than typical pulling forces that occur during normal use of the connected line organizers (1, 1a). The ridge 10 can be rounded on one or both of an inner and outer edge to facilitate connection and disconnection by allowing the ridge 10 to cam over the inside or outside edge 14 or 15 of the top 12. In other embodiments, the ridge 10 can be tapered, or can be any suitable profile or configuration for the desired connection characteristics.

The first line organizer 1 comprises a further first connector 4, referred to as 4a in the figures, extending from an opposite side 16 of the base 2 and a further second connector 5, referred to as 5a in the figures, such that the second line organizer 1a is connectable to either side of the base 2.

Advantageously, the first connector 4 on the first line organizer 1 is attachable to the second connector 5 on the second line organizer 1a and the first connector 4 on the second line organizer 1a is simultaneously attachable to the second connector 5 on the first line organizer 1 to connect the first and second line organizers to each other. This provides a more secure connection.

In the embodiments shown, the retainer 3 is a strap. In other embodiments, the retainer 3 can be a buckle, a clip, a latch, a loop, an elastic band, or any like mechanism that is capable of retaining a line between the base 2 and the retainer 3. It is preferred, that the strap 3 is resilient. This allows the strap to be stretched across the base 2 to apply a clamping force to the line on the base 2. The strap can be made of any resilient material suitable for the purpose described, including but not limited to rubber and elastomer.

The strap 3 has an aperture 17 towards a first end 18 of the strap and the base 2 has a protrusion 19, the protrusion receivable in the aperture 17 to attach the strap 3 to the base 2. In the particular embodiment shown, the strap 3 has a plurality of said apertures 17 along the strap 3 to allow adjustment of the length or tension of a portion of the strap that wraps over the base 2 thereby adjusting a clamping force exerted by the strap 3 and the base 2 onto the line positioned between the base and the strap.

The strap 3 also has one or more apertures 17, referred to as 17a in the figures, towards a second end 20 of the strap and the base 2 has a further protrusion 19, referred to as 19a in the figures. The further protrusion 19a is receivable in the aperture 17a to attach the strap to the base. The protrusion 19 and the further protrusion 19a are positioned on opposing sides 8 and 16 of the base 2 to allow the strap 3 to wrap over the base 2. In the particular embodiment shown, the base 2 has a platform 21 and two opposing sidewalls 22 extending away from the platform, the protrusion 19 and the further protrusion 19a each located on a respective said sidewall 22.

The protrusion (19, 19a) is a hook-like formation having a shaft 23 and a head 24. The head 24 is larger than the aperture (17, 17a) and the shaft 23 conforms with the aperture (17, 17a). The head 24 or the aperture (17, 17a) deforms from a resting shape when forced together to allow the head to pass through the aperture and then resiliently reverting to the resting shape after the head passes through the aperture thereby locking the strap 3 onto the protrusion (19, 19a). Furthermore, the head 24 or the aperture (17, 17a) is deformable from a resting shape when forced apart to allow the head to pass through the aperture thereby releasing the strap 3 from the protrusion (19, 19a).

The head 24 and the aperture (17, 17a) are dimensioned and/or are of a resilience such that the pulling force required to force them apart is larger than typical pulling forces that occur during normal use of the connected line organizers (1, 1a). As shown in the figures, the head 24 can be tapered to facilitate passing the head 24 through the aperture (17, 17a). The head 24 can also extend perpendicularly from the shaft 23 on an opposing side to increase the pulling force required to force the head 24 apart from the aperture (17, 17a). In other embodiments, the head 24 can taper in both directions, or can be rounded, or any other suitable profile or configuration for the desired connection characteristics.

Advantageously, the retainer 3 is releasably attachable to the base 2 to allow the retainer to be removed from the base as a whole. The particular embodiment described above allows this to occur since the protrusion 19 can be separated from the aperture 17, and the protrusion 19a can be separated from the aperture 17a. This is advantageous since the strap 3 can be easily replaced with another strap. For example, the strap may be worn or damaged. Also, different straps of different shapes, configurations, or colours can be used for different applications or to distinguish different line organizers (1, 1a). Different line organizers (1, 1a) may need to be distinguished to more easily identify different lines that are being retained by the line organizers respectively. The series of line organizers (1, 1a) that retain the same line along the path of the line can have the same retainer 3 to more easily identify the line, especially if the line is long or is one amongst a multitude of lines.

In this regard, the retainer 3 can have a labeling surface 25 to allow a user to label the retainer. For example, the labeling surface 25 can be such that a user can write a distinguishing mark or label with a marker, which can be permanent or non-permanent. Alternatively or additionally, the labeling surface 25 can be such that a user can apply a label, such as an adhesive sticker.

The base 2 has an attachment surface 26 on an underside to allow the base to be adhered to a substrate. The attachment surface 26 can be adhered by means of applying an adhesive such as a glue, or applying a double-sided adhesive sticker or tape.

Alternatively or additionally, the base 2 has a fastening aperture 27 for receiving a fastener to allow the base to be fastened to a substrate. The fastener can be a nail, screw, or any like fastener that is capable of fastening the base to the substrate, either permanently or non-permanently.

The base 2 has longitudinally extending ridges 28 to minimize transverse movement of a line relative to the base. The base 2 can also have a raised section 29, or any other suitable profile, to facilitate the clamping of smaller cross-section lines together with larger cross-section lines.

It is appreciated that the aforesaid embodiments are only exemplary embodiments adopted to describe the principles of the present invention, and the present invention is not merely limited thereto. Various variants and modifications can be made by those of ordinary skill in the art without departing from the spirit and essence of the present invention, and these variants and modifications are also covered within the scope of the present invention. Accordingly, although the invention has been described with reference to specific examples, it is appreciated by those skilled in the art that the invention can be embodied in many other forms. It is also appreciated by those skilled in the art that the features of the various examples described can be combined in other combinations.

It is claimed:

1. A line organizer comprising:
a base;
a retainer attachable to the base for retaining a line between the base and the retainer, wherein the retainer wraps over the base along a transverse axis;
a first connector on the base; and
a second connector on the base;
said line organizer being a first line organizer, the first connector on the first line organizer attachable to the second connector on a second line organizer to connect the first and second line organizers to each other such that the transverse axis of the first line organizer is parallel to and longitudinally offset from the transverse axis of the second line organizer such that the retainer attached to the first line organizer is not obstructed by the second line organizer when the retainer attached the first line organizer is wrapped over the base of the first line organizer.

2. The line organizer according to claim 1 wherein the first connector is a tab extending from a side of the base and the second connector is a slot, the tab of the first line organizer receivable into the slot of the second line organizer to connect the first and second line organizers to each other.

3. The line organizer according to claim 2 wherein the tab is snap-lockingly engagable in the slot.

4. The line organizer according to claim 2 comprising a further first connector extending from an opposite side of the base and a further second connector such that the second line organizer is connectable to either side of the base.

5. The line organizer according to claim 1 wherein the first connector on the first line organizer is attachable to the second connector on the second line organizer and the first connector on the second line organizer is simultaneously attachable to the second connector on the first line organizer to connect the first and second line organizers to each other.

6. The line organizer according to claim 1 wherein the retainer is a strap.

7. The line organizer according to claim 6 wherein the strap is resilient.

8. The line organizer according to claim 6 wherein the strap has an aperture towards a first end of the strap and the base has a protrusion, the protrusion receivable in the aperture to attach the strap to the base.

9. The line organizer according to claim 8 wherein the strap has a plurality of apertures along the strap to allow adjustment of the length or tension of a portion of the strap that wraps over the base thereby adjusting a clamping force exerted by the strap and the base onto the line positioned between the base and the strap.

10. The line organizer according to claim 8 wherein the strap has one or more apertures towards a second end of the strap and the base has a further protrusion, the further protrusion receivable in the aperture to attach the strap to the base.

11. The line organizer according to claim 10 wherein the protrusion and the further protrusion are positioned on opposing sides of the base to allow the strap to wrap over the base.

12. The line organizer according to claim 11 wherein the base has a platform and two opposing sidewalls extending away from the platform, the protrusion and the further protrusion each located on a respective said sidewall.

13. The line organizer according to claim 8 wherein the protrusion is a hook-like formation having a shaft and a head, the head being larger than the aperture and the shaft conforming with the aperture, the head or the aperture deforming from a resting shape when forced together to allow the head to pass through the aperture and then resiliently reverting to the resting shape after the head passes through the aperture thereby locking the strap onto the protrusion.

14. The line organizer according to claim 13 wherein the head or the aperture is deformable from a resting shape when forced apart to allow the head to pass through the aperture thereby releasing the strap from the protrusion.

15. The line organizer according to claim 1 wherein the retainer is releasably attachable to the base to allow the retainer to be removed from the base as a whole.

16. The line organizer according to claim 1 wherein the retainer has a labeling surface to allow a user to label the retainer.

17. The line organizer according to claim 1 wherein the base has an attachment surface on an underside to allow the base to be adhered to a substrate.

18. The line organizer according to claim 1 wherein the base has a fastening aperture for receiving a fastener to allow the base to be fastened to a substrate.

19. The line organizer according to claim 1 wherein the base has longitudinally extending ridges to minimize transverse movement of the line relative to the base.

* * * * *